W. S. EASTON.
ROTARY PUMP.
APPLICATION FILED MAR. 18, 1915.

1,192,287.

Patented July 25, 1916.

Witnesses
Jmes E. Sproll
George H. Moree

Inventor
William S. Easton.
By Adams & Reynolds
Attorneys

UNITED STATES PATENT OFFICE.

WILLIAM S. EASTON, OF SEATTLE, WASHINGTON.

ROTARY PUMP.

1,192,287.   Specification of Letters Patent.   Patented July 25, 1916.

Application filed March 18, 1915. Serial No. 15,155.

*To all whom it may concern:*

Be it known that I, WILLIAM S. EASTON, a citizen of the United States of America, and a resident of the city of Seattle, in the county of King and State of Washington, have invented certain new and useful Improvements in Rotary Pumps, of which the following is a specification.

My invention consists of a rotary pump and comprises the novel parts and combinations of parts which will be hereinafter described and particularly pointed out in the claims.

The object of my invention is to produce a pump which will be cheap to manufacture, have a large capacity, be simple in construction and may be efficiently operated at relatively low speeds.

In the accompanying drawings I have shown my invention embodied in the form which is now preferred by me.

Figure 1:
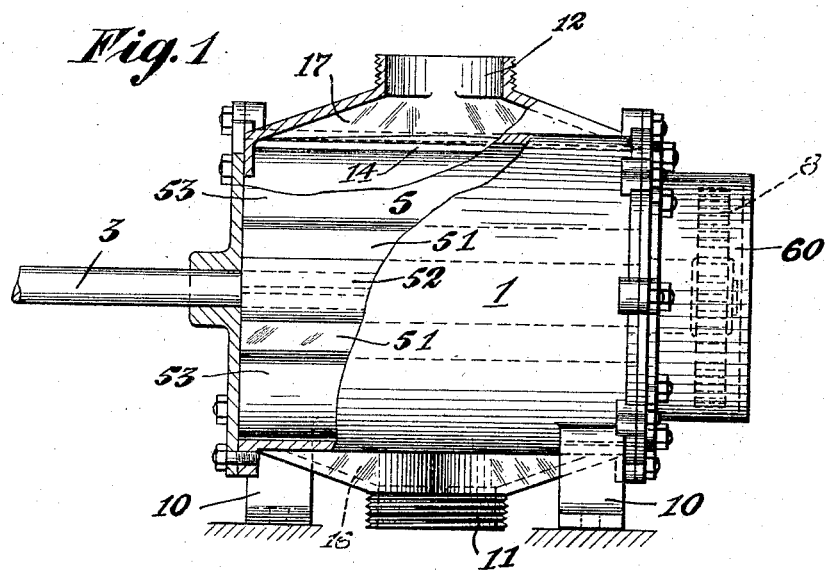
Figure 2:
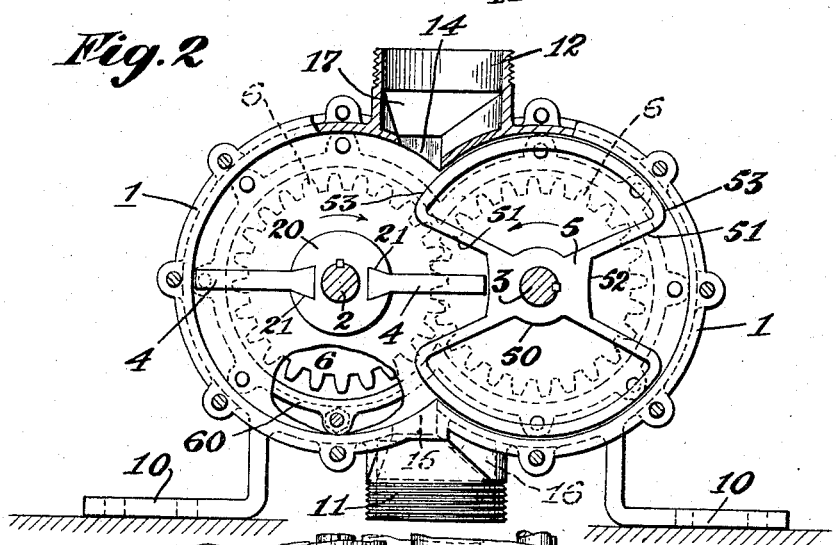
Figure 3:
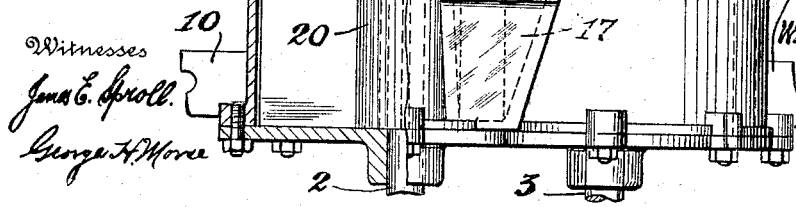

Figure 1 is a side view of my pump, one end thereof being broken away to show the interior construction. Fig. 2 is a transverse sectional elevation. Fig. 3 is a top plan with parts broken away.

My pump is of that class which has two or more revolving members turning upon parallel axes and provided with intermeshing recesses and projections and an inclosing casing. The casing 1, is, in general outline, that of two cylinders having their adjacent sides considerably overlapping. It is provided with feet 10 by which it may be secured upon a foundation. Journaled in this casing are two parallel shafts 2, 3, each concentric with its particular side of the casing.

Upon shaft 2 is secured a sleeve 20, which is cylindrical in shape, except that it has two dovetail grooves 21 extending lengthwise thereof, these being positioned oppositely. In each of these grooves is secured a wing 4 which extends radially and by its outer edge makes close engagement with but does not quite touch the inner curved surface of the casing 1, and also with the surface 52 of the complemental member 5.

The complemental member 5 is in the shape of a cylinder which has two recesses extending lengthwise thereof of such size and shape as coöperate with the wings 4 to permit turning while maintaining close contact while passing the wings 4. The ends of this member 5 are closed and fit closely against the end walls of the casing to prevent any great amount of leakage.

The outer surface 53 of member 5 is of much greater radius than is the surface of sleeve 20 with which it coöperates. The outer ends of the wings 4, also, are of greater radius than the surfaces 52. These surfaces having the greater radius must, therefore, turn at a greater speed than do the surfaces of lesser radius. If these surfaces were permitted to touch, there would be a continual grinding action. The pump would wear out unevenly, and would lose its efficiency. These coöperating surfaces are, therefore, slightly separated, say by .01 of an inch, so that they will just clear. But little water can leak through, and the coöperating surfaces do not wear out.

The casing has an inlet port 15 which extends substantially throughout its length. It communicates with a small, pyramidal shaped chamber 16, which latter connects with a flange 11 to which a suction pipe may be attached. This port 15 communicates with the chamber which contains the rotative member 20.

At the opposite side of the casing is an outlet or discharge port 14, which connects the chamber which contains the rotative member 20 with a pyramidal shaped chamber 17, this discharging through a sleeve 12 which is adapted for the connection of a discharge pipe.

The shafts 2 and 3 project through one end wall of the casing sufficiently to receive thereon gear wheels, 6, 6, whereby like rotation of the impelling members 4 and 5 is insured. The power for turning the pump may be applied through one of these shafts.

I have shown a casing 60 which incloses the gears. This protects them from dirt, and prevents accidents through catching of fingers or clothing therein. It has also another important function.

In pumps of this character, there is a tendency for the water to leak out through the bearings, and packing glands are often used to prevent this. In any case, however, there is a little leakage. The water is frequently muddy, and this leakage carries small particles of grit into the bearings. This eventually destroys the bearing. Therefore, in order to prevent this leakage past the bearing, I fill this casing 60, in which the gears run, with a liquid, preferably clean water.

This, being practically incompressible, offers resistance to the tendency of the water in the pump cylinders to leak through the bearing. The ends of the sleeve 20 and member 5 fit the cylinder wall closely enough to prevent leakage.

While I have shown two wings 4, it is evident that one or three may be used, although I prefer to use two.

What I claim as my invention and desire to patent is:

1. A rotary pump having two impelling members mounted to turn upon parallel axes, one having radially placed wings extending lengthwise thereof, and the other having recesses complemental to said wings, the coöperating surfaces of said members being of different radii, said coöperating surfaces being separated sufficiently to permit a small amount of leakage, a casing inclosing said impelling members, said casing having an inlet port at one side and an outlet port at the other side of the portion of said casing occupied by the impeller which carries the wings, and means for securing synchronous rotation of the impellers.

2. A rotary pump having two impelling members mounted to turn upon parallel axes, one having radially placed wings extending lengthwise thereof, and the other having recesses complemental to said wings, the coöperating surfaces of said members being of different radii, said coöperating surfaces being separated sufficiently to permit a small amount of leakage, a casing inclosing said impelling members, said casing having an inlet port at one side and an outlet port at the other side of the portion of said casing occupied by the impeller which carries the wings, gears upon the shafts carrying the impelling members, and without the pump casing, said gears intermeshing to maintain synchronous rotation of the impellers, and a water tight casing secured upon the end of the pump casing and entirely surrounding said gears, said water-tight casing being adapted to be filled with a clean liquid.

3. A rotary pump having two impelling members mounted to turn upon parallel shafts, one having radially placed wings extending lengthwise thereof, and the other having recesses complemental to said wings, said wings extending more than half the distance between the shafts, and the recessed member having surfaces extending more than half the distance between the shafts, the coöperating surfaces of said impelling members being separated sufficiently to permit a small amount of leakage, a casing surrounding said impelling members, said casing having an inlet port at one side and an outlet port at the other side of the portion of said casing occupied by the impeller which carries the wings, and means for securing synchronous rotation of the impellers.

Signed at Seattle, Washington, this 6th day of March, 1915.

WM. S. EASTON.

Witnesses:
HENRY L. REYNOLDS,
E. C. EGLIN.